(12) United States Patent
Le Grand

(10) Patent No.: US 10,139,253 B2
(45) Date of Patent: Nov. 27, 2018

(54) ADJUSTMENT OF INTERRUPT TIMESTAMPS OF SIGNALS FROM A SENSOR BASED ON AN ESTIMATED SAMPLING RATE OF THE SENSOR

(71) Applicant: GOOGLE LLC, Mountain View, CA (US)

(72) Inventor: Etienne Le Grand, Mountain View, CA (US)

(73) Assignee: Google LLC, Mountain View, CA (US)

(*) Notice: Subject to any disclaimer, the term of this patent is extended or adjusted under 35 U.S.C. 154(b) by 875 days.

(21) Appl. No.: 14/265,954

(22) Filed: Apr. 30, 2014

(65) Prior Publication Data
US 2015/0317230 A1    Nov. 5, 2015

(51) Int. Cl.
*G06F 11/34*    (2006.01)
*G01D 9/00*    (2006.01)

(52) U.S. Cl.
CPC ......... *G01D 9/005* (2013.01); *G06F 11/3476* (2013.01)

(58) Field of Classification Search
CPC .... G01D 9/005; G01D 21/00; G06F 11/3476; G06F 11/34
See application file for complete search history.

(56) References Cited

U.S. PATENT DOCUMENTS

| | | | |
|---|---|---|---|
| 8,406,217 B2 | 3/2013 | Zakrzewski | |
| 2010/0135263 A1* | 6/2010 | Zakrzewski | G01D 21/00 370/338 |
| 2012/0163520 A1* | 6/2012 | Liu | G01S 5/0018 375/356 |
| 2013/0094372 A1 | 4/2013 | Boot | |
| 2013/0282875 A1 | 10/2013 | Aweya et al. | |
| 2014/0040653 A1 | 2/2014 | Etkin et al. | |

FOREIGN PATENT DOCUMENTS

CN    102857333    1/2013

\* cited by examiner

*Primary Examiner* — Mohamed Charioui
*Assistant Examiner* — Jeremy Delozier
(74) *Attorney, Agent, or Firm* — McDonnell Boehnen Hulbert & Berghoff LLP

(57) ABSTRACT

Examples include systems and methods for adjusting interrupt timestamps associated with sensor measurement data. One method includes receiving from a sensor an interrupt signal, storing an interrupt timestamp corresponding to the interrupt signal, and determining expected sampling rates associated with the sensor. The method also includes determining a first minimal latency timestamp based on a comparison of one or more previously stored interrupt timestamps and the expected sampling rates, and determining a second minimal latency timestamp based on the interrupt timestamp, one or more previously stored interrupt timestamps, and the expected sampling rates. The method also includes determining an estimated sampling rate of the sensor based on the first and second minimal latency timestamps, and determining an adjusted interrupt timestamp corresponding to the interrupt signal based on the estimated sampling rate and the interrupt timestamp.

17 Claims, 12 Drawing Sheets

ADJUSTMENT OF INTERRUPT TIMESTAMPS OF SIGNALS FROM A SENSOR BASED ON AN ESTIMATED SAMPLING RATE OF THE SENSOR

BACKGROUND

Unless otherwise indicated herein, the materials described in this section are not prior art to the claims in this application and are not admitted to be prior art by inclusion in this section.

A location of a computing device can be determined using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g., an absolute location). In a different example, a mobile computing device may receive a signal from either a cellular base station or an 802.11 access point. The cellular base station or an 802.11 access point may estimate an exact location. Based on the location of either the cellular base station or an 802.11 access point, the mobile computing device can calculate its exact position.

Within some instances, a localization of a mobile computing device may occur via use of data from multiple different networks. Many location based services can be provided to a mobile computing device based on determining the location of the mobile computing device.

SUMMARY

In one example, a method is provided that comprises receiving, by a processor from a sensor, an interrupt signal. The method also comprises storing, by the processor, an interrupt timestamp corresponding to the interrupt signal. The method also comprises determining, by the processor, a plurality of expected sampling rates associated with the sensor, wherein a given sampling rate is based on a sampling time period. The method also comprises determining, by the processor, a first minimal latency timestamp based on a comparison of one or more previously stored interrupt timestamps and the plurality of expected sampling rates. The method also comprises determining, by the processor, a second minimal latency timestamp based on the interrupt timestamp, one or more previously stored interrupt timestamps, and the plurality of expected sampling rates, wherein the second minimal latency timestamp indicates an interrupt timestamp among the interrupt timestamp and the one or more previously stored interrupt timestamps whose value results in a smallest latency value. The method also comprises determining, by the processor, an estimated sampling rate of the sensor based on the first minimal latency timestamp and the second minimal latency timestamp. The method also comprises determining, by the processor, an adjusted interrupt timestamp corresponding to the interrupt signal based on the estimated sampling rate and the interrupt timestamp.

In another example, a computer readable memory having stored therein instructions, that when executed by a computing device, cause the computing device to perform functions is provided. The functions comprise receiving an interrupt signal. The functions also comprise storing an interrupt timestamp corresponding to the interrupt signal. The functions also comprise determining a plurality of expected sampling rates associated with the sensor, wherein a given sampling rate is based on a sampling time period. The functions also comprise determining a first minimal latency timestamp based on a comparison of one or more previously stored interrupt timestamps and the plurality of expected sampling rates. The functions also comprise determining a second minimal latency timestamp based on the interrupt timestamp, one or more previously stored interrupt timestamps, and the plurality of expected sampling rates, wherein the second minimal latency timestamp indicates an interrupt timestamp among the interrupt timestamp and the one or more previously stored interrupt timestamps whose value results in a smallest latency value. The functions also comprise determining an estimated sampling rate of the sensor based on the first minimal latency timestamp and the second minimal latency timestamp. The functions also comprise determining an adjusted interrupt timestamp corresponding to the interrupt signal based on the estimated sampling rate and the interrupt timestamp.

In still another example, a computing device is provided that comprises one or more processors, a sensor, and data storage configured to store instructions that, when executed by the one or more processors, cause the computing device to perform functions. The functions comprise receiving, by the one or more processors from the sensor, an interrupt signal. The functions comprise storing, by the one or more processors, an interrupt timestamp corresponding to the interrupt signal. The functions also comprise determining, by the one or more processors, a plurality of expected sampling rates associated with the sensor, wherein a given sampling rate is based on a sampling time period. The functions also comprise determining, by the one or more processors, a first minimal latency timestamp based on a comparison of one or more previously stored interrupt timestamps and the plurality of expected sampling rates. The functions also comprise determining, by the one or more processors, a second minimal latency timestamp based on the interrupt timestamp, one or more previously stored interrupt timestamps, and the plurality of expected sampling rates, wherein the second minimal latency timestamp indicates an interrupt timestamp among the interrupt timestamp and the one or more previously stored interrupt timestamps whose value results in a smallest latency value. The functions also comprise determining, by the one or more processors, an estimated sampling rate of the sensor based on the first minimal latency timestamp and the second minimal latency timestamp. The functions also comprise determining, by the one or more processors, an adjusted interrupt timestamp corresponding to the interrupt signal based on the estimated sampling rate and the interrupt timestamp.

In yet another example, a system is provided that comprises a means for receiving an interrupt signal. Means for storing an interrupt timestamp corresponding to the interrupt signal. Means for determining a plurality of expected sampling rates associated with the sensor, wherein a given sampling rate is based on a sampling time period. Means for determining a first minimal latency timestamp based on a comparison of one or more previously stored interrupt timestamps and the plurality of expected sampling rates. Means for determining a second minimal latency timestamp based on the interrupt timestamp, one or more previously stored interrupt timestamps, and the plurality of expected sampling rates, wherein the second minimal latency timestamp indicates an interrupt timestamp among the interrupt timestamp and the one or more previously stored interrupt timestamps whose value results in a smallest latency value. Means for determining an estimated sampling rate of the sensor based on the first minimal latency timestamp and the second minimal latency timestamp. And means for determining an adjusted interrupt timestamp corresponding to the interrupt signal based on the estimated sampling rate and the interrupt timestamp.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Figure 1:
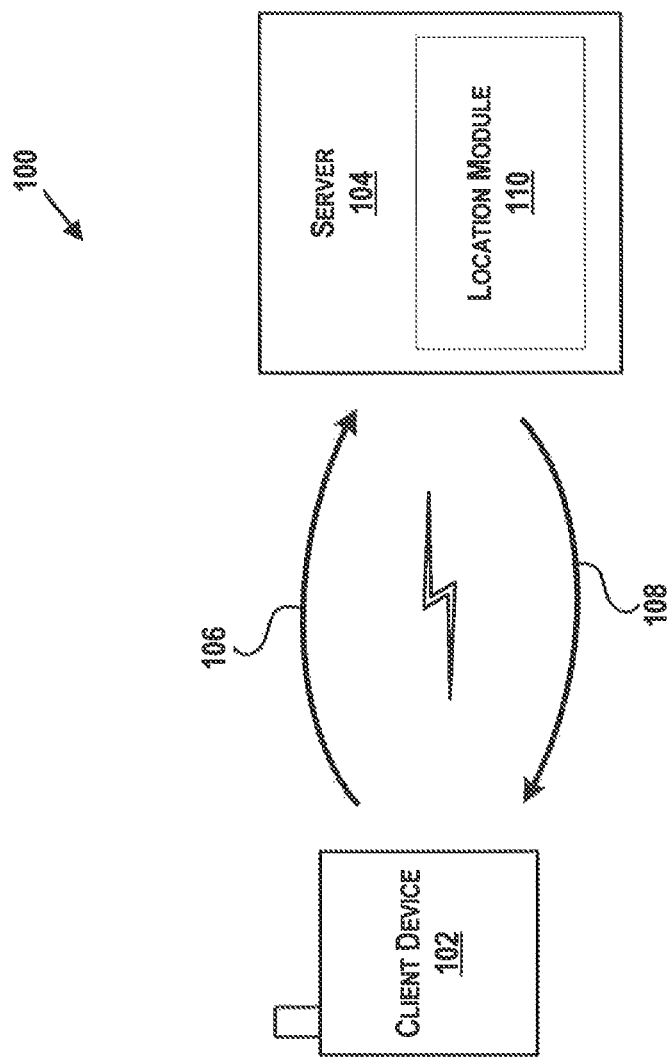
FIG. 1 illustrates an example communication system in which an example method may be implemented.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to or receive data 106 from the client device 102. The server 104 may include a location module 110 which may be configured to process the data 106 received from the client device 102 to determine locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location, updated location history information, or information based on the locations of the device.

Figure 2A:
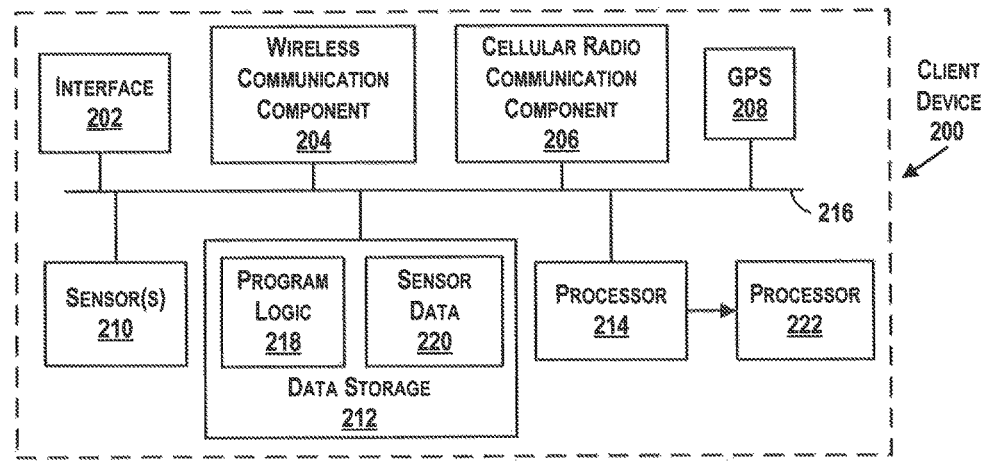
FIG. 2A illustrates a schematic drawing of an example computing device.

FIG. 2A illustrates a schematic drawing of an example computing device 200. In FIG. 2A, the computing device takes a form of a client device 200. In some examples, some components illustrated in FIG. 2A may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2A may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, a signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, magnetometer, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a GPU). Example methods described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 2B:
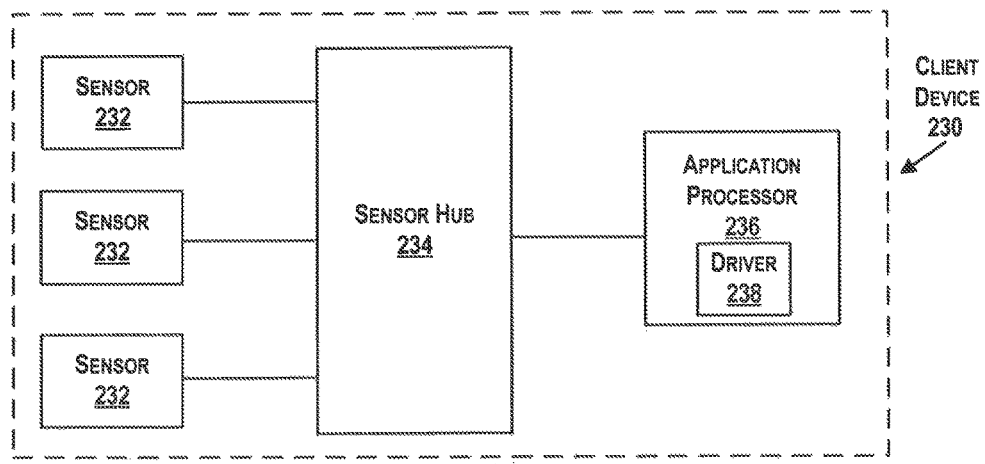
FIG. 2B illustrates a schematic drawing of another example computing device.

FIG. 2B illustrates a schematic drawing of another example computing device 230. The computing device 230 in FIG. 2B may be representative of a portion of the client device 200 shown in FIG. 2A. The client device 230 may include a number of sensors 232, a sensor hub 234, and an application processor ("AP") 236 that may include a driver 238. The sensors 232, the sensor hub 234, and the AP 236 may be linked together by one or more communication links. The sensors 232 may each output to the sensor hub 234. The sensor hub 234 may receive inputs from and output to the AP 236. Further, the sensors 232 and the sensor hub 234 may operate according to a first clock (not shown), and the AP 236 may operate on a second clock (not shown). There may be timing offsets and/or scaling differences between the first clock and the second clock, which may be unknown.

The sensors 232 may take various forms. For example, one or more of the sensors 232 may take the form of a GPS sensor, accelerometer, temperature sensor, gyroscope, pedometer, light sensor, microphone, camera, magnetometer, or other location and/or context-aware sensors. In any event, each sensor 232 may be configured to detect a physical event at a specific point in time and responsively output measurement data associated with the detected physical event. This process of generating measurement data based on detecting a physical event may be referred herein as a "sensor event." It should be understood that each sensor may detect a different type of physical event.

In practice, each sensor 232 may have a known sampling rate. That is, each sensor 232 may be expected to generate sensor events at a constant rate, such as 100 Hz (e.g., 100 sensor events per second). Accordingly, in some examples, each sensor 232 may include an internal clock that is operable to cause the sensor to obtain measurement data according to the sampling rate. Further, each sensor 232 may have a known sampling rate error that may be due to one or more sensor characteristics. For example, a sensor may have a sampling rate error of plus/minus a certain percentage point, such as +/−1%, 10%, 50%. Continuing off of the above example, a +/−1% sampling rate error may indicate that, in practice, the sensor generates 99 to 101 sensor events per second. Other example sampling rates and sampling rate errors are also possible.

The sensor hub 234 may take various forms as well. For example, the sensor hub 234 may take the form of a microcontroller or a co-processor. The sensor hub 234 may be configured to control the sensors 234. In some examples, the sensor hub 234 may include an internal clock that is operable to cause the sensor hub 234 to send respective measurement requests to the sensors 232 according to respective sampling rates. Further, the sensor hub 234 may be configured to receive respective measurement data from the sensors 232 and output to the AP 236 corresponding interrupt signals indicating that one or more sensors 232 have detected a physical event.

In general, the AP 236 may be configured to control the client device 230. In some examples, the AP 236 may be configured in a similar manner as the processor 214 and/or the processor 222 described above with reference to the client device 200 of FIG. 2A. In any event, the AP 236 may be configured to receive from the sensor hub 234 one or more interrupt signals, acknowledge the received interrupt signals, and then the driver 238 may be configured to generate and store in memory corresponding interrupt timestamps.

In practice, there may be a delay between the time at which the AP receives an interrupt signal and the time that the AP acknowledges the interrupt signal and the driver stores a corresponding interrupt timestamps. Accordingly, the AP 236 may be configured to perform one or more functions to adjust the stored interrupt timestamps so that the timestamps more accurately reflect when a corresponding sensor generated a sensor event. Such functions are discussed in further detail below.

Further, the AP 236 may be configured to output one or more acknowledgement signals corresponding to the received interrupt signals indicating that the sensor hub 234 should gather measurement data from the corresponding sensors 232. The AP 236 may also be configured to receive from the sensor hub 234 measurement data collected by the sensors 232 and perform a number of types of functions based on the received measurement data and adjusted interrupt times, such as estimate the location of the client device 230. Further still, the AP 236 may be configured to store adjusted interrupt timestamps along with the received measurement data.

In some examples, the client device 230 may not include the sensor hub 234. In such examples, the sensors 232 may send interrupt signals directly to the AP 236, and the driver 238 may generate corresponding interrupt timestamps when the AP 236 acknowledges the interrupt signals.

Figure 3:
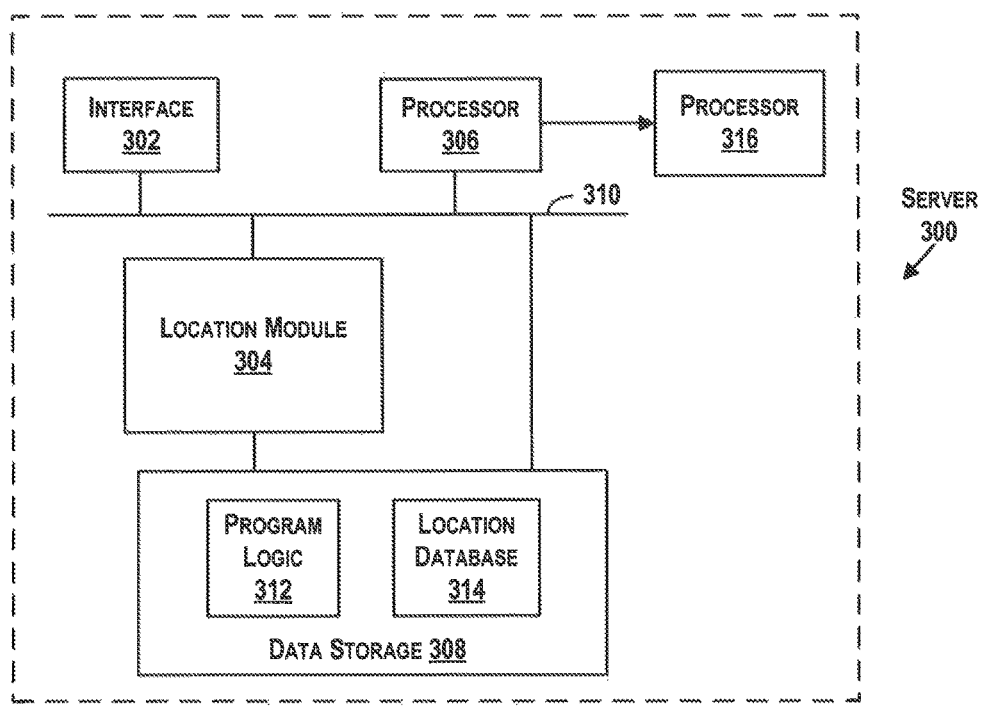
FIG. 3 illustrates a schematic drawing of yet another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of an accelerometer, gyroscope, or other sensors of the client device, as well as based on location determinations of the client device. The location module 304 may further be configured to determine and store a history of sensor measurements of the client device for later reprocessing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316 which may be an application specific processor for input/output functionality. In other examples, functions of the processor 306 and the processor 316 may be combined into one component.

Within examples, measurements collected from various sensors of a device (such as WiFi components, GPS sensors, and inertial sensors) can be combined with information from external databases (such as known locations of WiFi access points or building floor plans) to estimate a location or movement of the device in real-time. Recording the real-time location estimate at all times (or intervals/increments of time) may also produce a location history.

Figure 4:
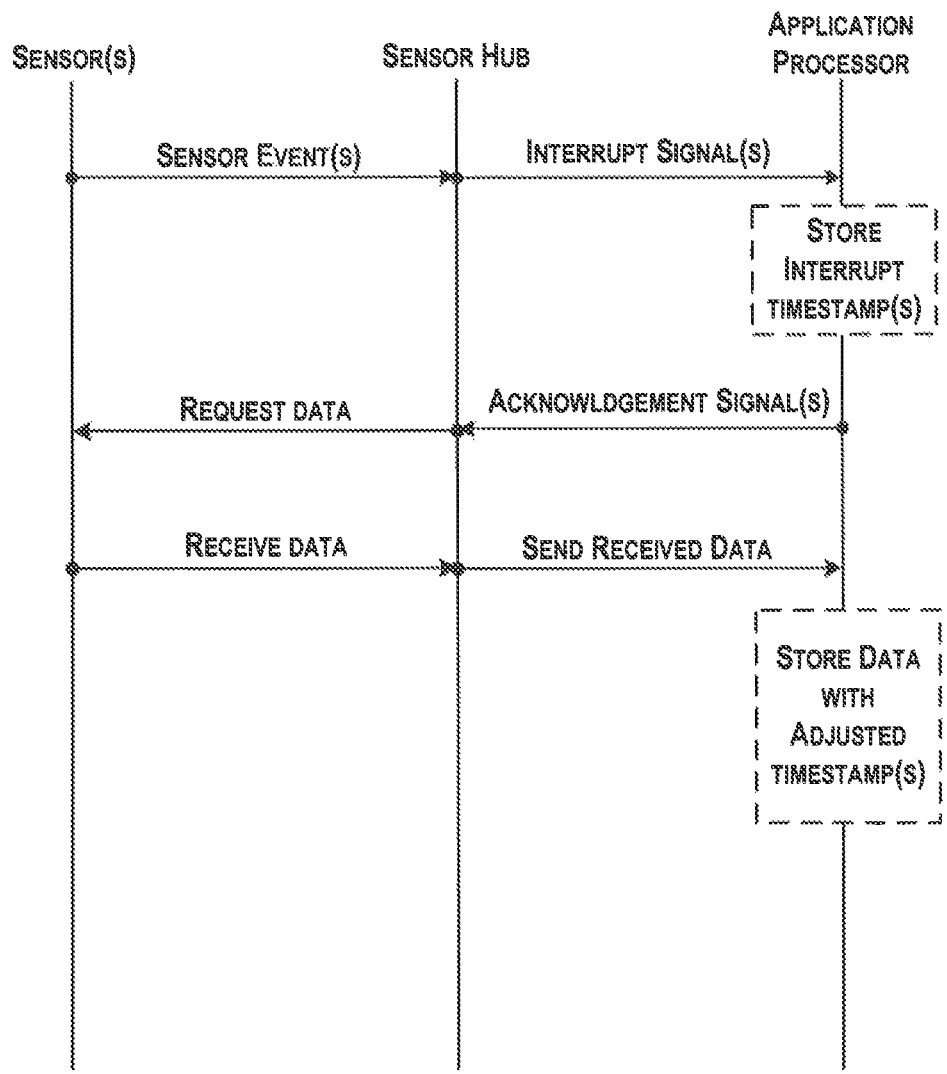
FIG. 4 is a timing diagram illustrating an example method for adjusting timestamps associated with measurement data received from one or more sensors.

FIG. 4 is a timing diagram illustrating an example method for adjusting timestamps associated with measurement data received from one or more sensors. As shown, a sensor may output to a senor hub a signal related to a sensor event. In turn, the sensor hub may provide an interrupt signal to an AP. In practice, multiple sensors may output to the sensor hub respective signals simultaneously or at various intervals, and in turn, the sensor hub may output to the AP multiple interrupt signals.

Thereafter, the AP may acknowledge the interrupt signals and store respective interrupt timestamps corresponding to the interrupt signals. In practice, there may be a varying amount of delay that occurs between the point in time that the AP receives the interrupt signals and the time that the AP acknowledges the interrupt signals and stores the interrupt timestamps. That is, a given timestamp may include a time value that indicates that the AP received an interrupt signal later than the AP actually did. Such a delay, which may be referred herein as "latency", may be the result of the AP being in a "busy" state (e.g., the AP may be performing other functions). Additionally or alternatively, latency may be due to the sensor hub and/or the communication link being in a busy state. In some examples, the latency may be on the order of tens of milliseconds, or perhaps the latency may be larger. After storing the interrupt timestamps, the AP may perform one or more functions, discussed in detail below, to adjust the stored interrupt timestamps to more accurately reflect the time at which the sensor performed its measurement.

At some point in time, the AP may provide an acknowledgement signal to the sensor hub, which in turn may request measurement data from the sensor. The sensor hub may then receive measurement data from the sensor and provide such data to the AP. The AP may then store the measurement data with a corresponding adjusted timestamp. In some examples, the AP may not provide an acknowledgement signal, and accordingly, the sensor hub and sensor may provide the measurement data without waiting for such a signal from the AP.

Figure 5:
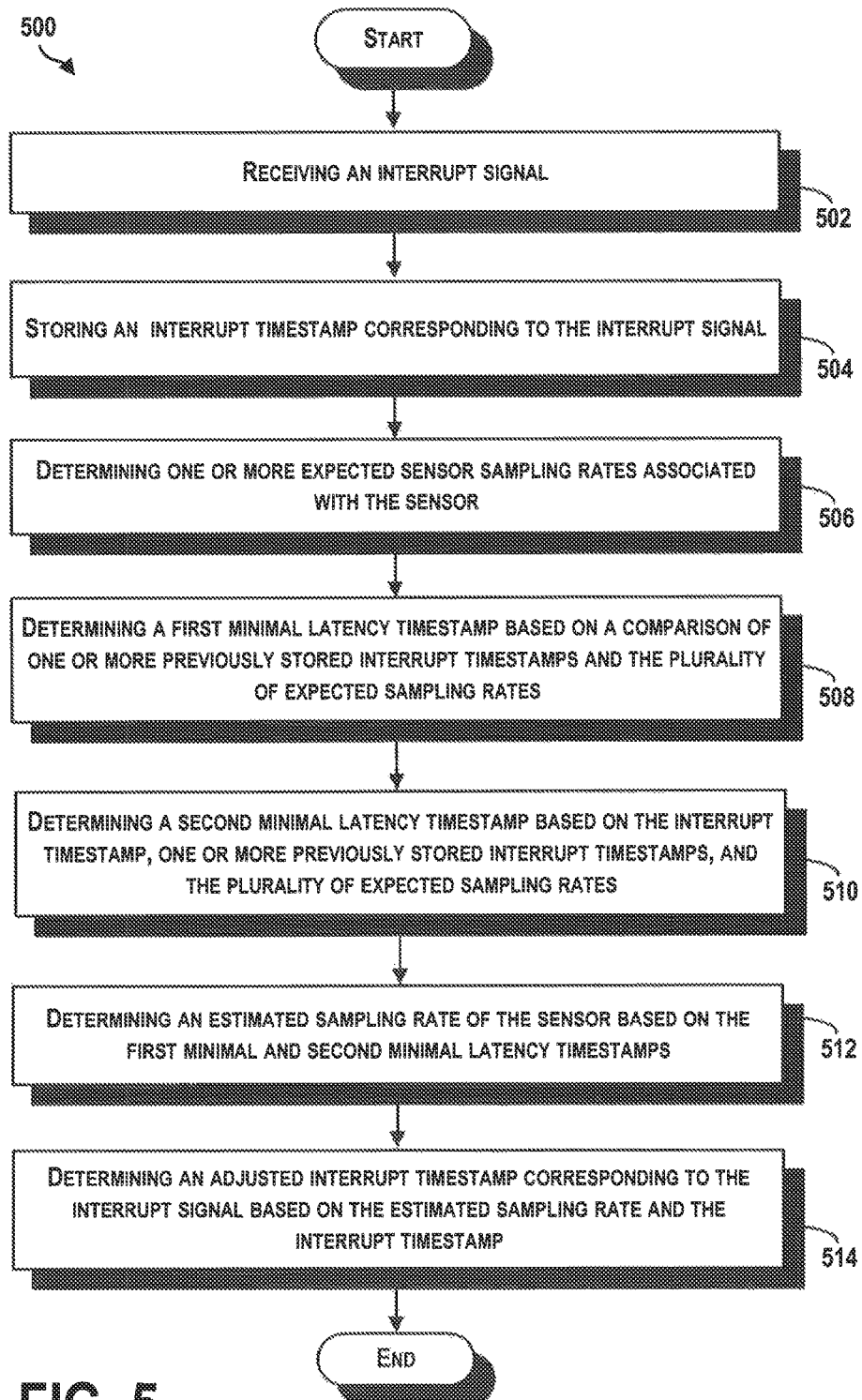
FIG. 5 is a flowchart of an example method of adjusting interrupt timestamps associated with measurement data received from a sensor, in accordance with at least some embodiments described herein.

FIG. 5 is a flowchart of an example method of adjusting interrupt timestamps associated with measurement data received from a sensor, in accordance with at least some embodiments described herein. Method 500 shown in FIG. 5 presents an embodiment of a method that, for example, could be used with the system 100 in FIG. 1, the client device 200 in FIG. 2A, the client device 230 in FIG. 2B, or the server 300 in FIG. 3, for example, or may be performed by a combination of any systems and devices in FIGS. 1-3. Method 500 may include one or more operations, functions, or actions as illustrated by one or more of blocks 502-514. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

Furthermore, for the method 500 and other processes and methods disclosed herein, each block in FIG. 5 may represent circuitry that is wired to perform the specific logical functions in the process.

Functions of the method 500 may be fully performed by a computing device (or components of a computing device), or may be distributed across multiple computing devices and/or a server. In some examples, the computing device may receive information from sensors of the computing device, or where the computing device is a server, the information can be received from another device that collects the information.

At block 502, the method 500 includes receiving, by a processor from a sensor, an interrupt signal. In some examples, this process may involve the processor receiving the interrupt signal directly from the sensor. For example, the processor 214 in FIG. 2A may receive the interrupt signal directly from the sensor 210. In other examples, this process may involve the processor receiving the interrupt signal indirectly from the sensor. For example, the AP 236 in FIG. 2B may receive the interrupt signal from the sensor hub 234, which in turn may have received measurement data from one of the sensors 232.

In practice, the processor may simultaneously or at various intervals receive interrupt signals from multiple sensors. For sake of simplicity, the method 500 is described herein as receiving signals from one sensor, but this should not be construed as limiting.

At block 504, the method 500 includes storing, by the processor, an interrupt timestamp corresponding to the interrupt signal. This process may involve the processor first acknowledging receipt of the interrupt signal and then generating and storing an interrupt timestamp for the interrupt signal. The interrupt timestamp may include a time value that is relative to a processor clock. In some examples, the processor clock may provide time relative to when the processor was powered on. In other examples, the processor clock may provide time according to a given time standard, such as the Coordinate Universal Time. Other examples are also possible.

Figure 6A:
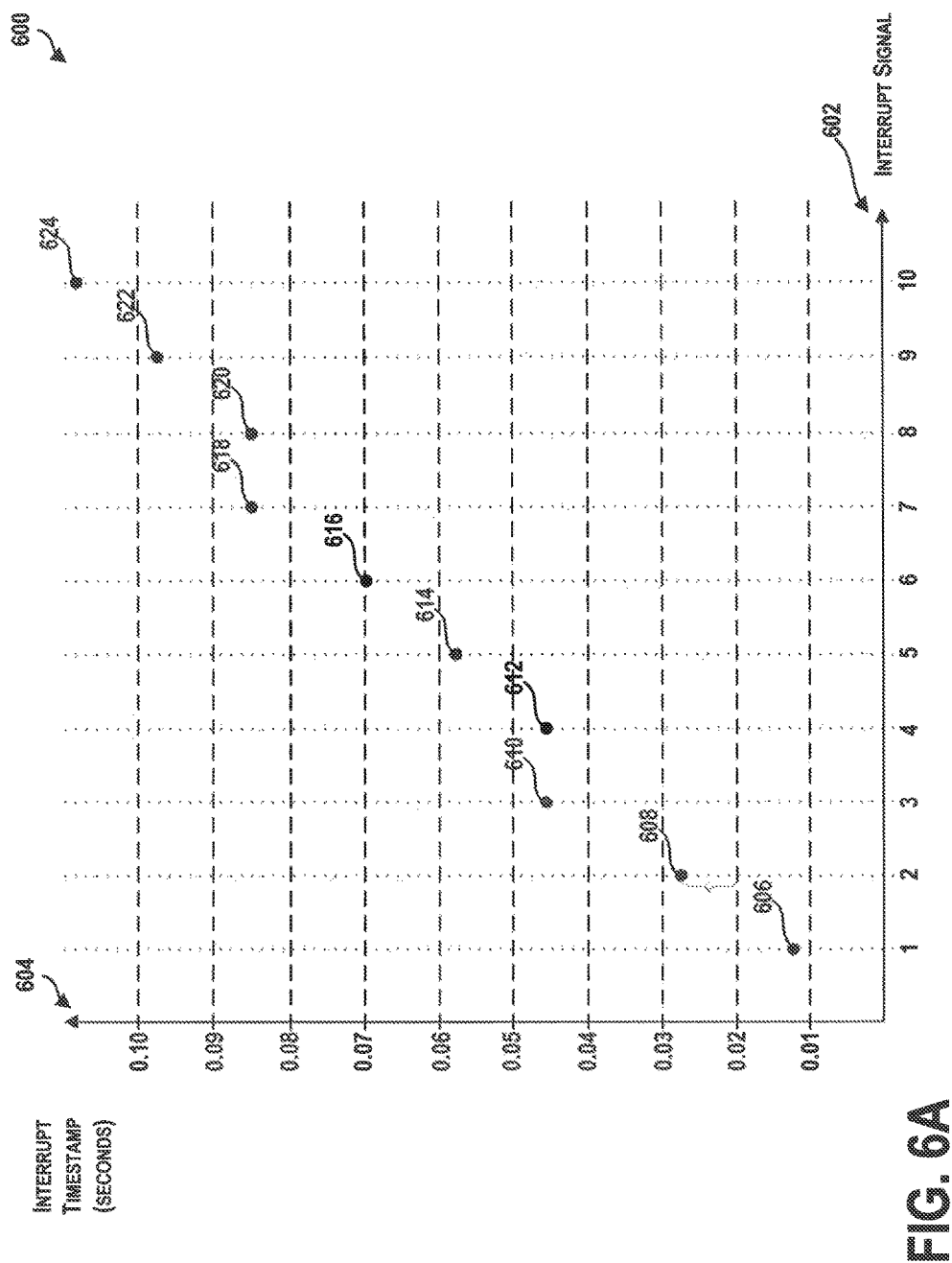
FIG. 6A is a conceptual diagram illustrating an example of a plurality of stored interrupt timestamps.

To illustrate an example, FIG. 6A is a conceptual diagram illustrating an example of a plurality of stored interrupt timestamps. As shown, diagram 600 includes an x-axis 602 that represents a plurality of interrupt signals and a y-axis 604 that represents interrupt timestamp values, measured in seconds. The diagram 600 also includes points 606-624 that represent a stored interrupt timestamp that is associated with a given interrupt signal and indicate a timestamp value of the stored interrupt timestamp. For example, the point 606 represents a stored interrupt timestamp for interrupt signal number 1 (e.g., the first interrupt signal received by the processor) having a timestamp value of slightly more than 0.01 seconds, for instance, after the processor was powered on. The point 608 represents a stored interrupt timestamp for interrupt signal number 2 having a timestamp value of slightly less than 0.03 seconds. And so forth. Notably, multiple stored interrupt timestamps may include the same timestamp value (e.g., the points 610 and 612 have the same timestamp value). The points 606-622 may represent previously stored interrupt timestamps that correspond to interrupt signals (e.g., interrupt signals 1-9, respectively) that the processor has previously received from the sensor, and the point 624 (e.g., interrupt signal 10) may represent the interrupt timestamp stored by the processor in block 504.

As discussed above, a given interrupt timestamp may include latency, for example, due to the time it takes the processor to receive an interrupt signal and store the interrupt timestamp. For example, ideally, the sensor would generate sensor events according to an expected sampling rate, such as 100 Hz, and thus, the processor would receive interrupt signals according to the sampling time period of the expected sampling rate. In such an ideal setting, ideal interrupt timestamps would have values of $$\frac{1}{\text{expected sampling rate}} * \text{interrupt number},$$

where the interrupt number is an integer greater than zero. For example, an expected sampling rate of 100 Hz would result in ideal interrupt timestamps values of 0.01 (seconds) *interrupt number. To illustrate, turning back to FIG. 6A, the point 606 (e.g., corresponding to the first interrupt signal received by the processor) would have an ideal interrupt timestamp value of 0.01 seconds, the point 608 (e.g., corresponding to the second interrupt signal received by the processor) would have a value of 0.02 seconds, and so forth. However, in practice, varying amounts of latency exists, which can be visualized by the space between a given point and an expected sampling time. For instance, latency of the point 608 may be represented by the vertical space between the point 608 and an ideal interrupt timestamp value of 0.02 seconds (e.g., as identified by the bracket). The latency of the point 608 is over half of a hundredth of a second.

In addition to latency, each interrupt timestamp may also include an offset that may be due to the sensor (and/or sensor hub) and the processor operating on two different clocks that are timed differently. Although not shown in FIG. 6A, an offset may be conceptualized by each of the points 606-624 being raised in the diagram 600 by the same amount of time.

For sake of simplicity, each point 606-624 represents a single sensor event, and the expected time between two consecutive sensor events is assumed to be constant. However, in some cases, the sensor events may be generated intermittently. For example, a sensor may be configured to generate a sensor event for each step a user takes. Such a sensor, the sensor hub, and the AP may operate to generate and store interrupt timestamps for such sensor measurements.

Returning to FIG. 5, at block 506, the method 500 includes determining, by the processor, a plurality of expected sampling rates associated with the sensor, where a given sampling rate is based on a sampling time period. This function may be performed in a number of ways.

In one example, this function may involve the processor first determining an ideal sensor sampling rate, which may be based on one or more characteristics of the sensor and/or the sensor hub. For example, sensor specifications provided by the sensor manufacturer may indicate that the sensor theoretically operates at a given sensor sampling rate. Such sensor specifications may be provided to the processor by a user input or the processor may automatically obtain such specifications when the sensor is first linked with the processor. Other examples are also possible.

Figure 6B:
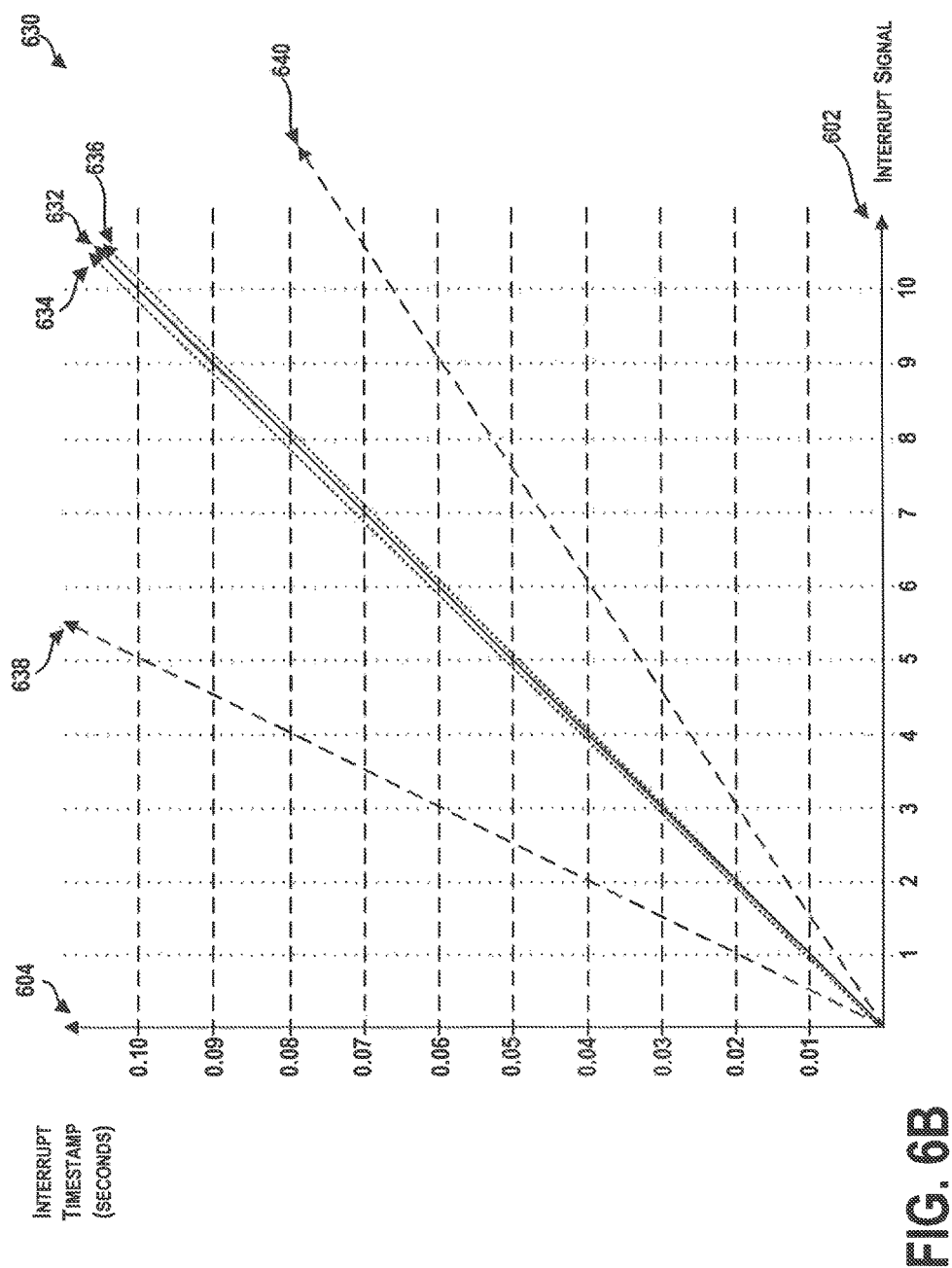
FIG. 6B is a conceptual diagram illustrating an example of expected sampling rates.

To illustrate, FIG. 6B is a conceptual diagram illustrating an example of expected sampling rates. Diagram 630 includes the same axes as FIG. 6A and also includes various expected sampling rate lines. Sampling rate line 632 may indicate an ideal sensor sampling rate, for example, 100 Hz. As shown, the sampling rate line 632 intersects with the dotted vertical lines and the dashed horizontal lines at points corresponding to expected timestamp values for the interrupt signals (e.g., these points represent expected sampling times).

In other examples, the processor determining the plurality of expected sampling rates may involve determining an expected sampling rate range. This function may also be based on one or more characteristics of the sensor and/or the sensor hub. For example, the sensor, an internal sensor clock, and/or the sensor hub may have a known error rate. Based on these one or more known error rates, the processor may determine the expected sampling rate range. For instance, the known error rate may be +/−1% and the expected sampling rate range may then be the ideal sensor sampling rate +/−1%. For example, continuing off the above example, the expected sampling rate range may be determined to be 99 Hz to 101 Hz.

The processor may then determine the plurality of expected sampling rates from the expected sampling rate range. In example implementations, the processor may select N expected sampling rates within the expected sampling rate range, perhaps splitting them equally (e.g., when N equals 5, the sensor sampling rates may be 99 Hz, 99.5 Hz, 100 Hz, 100.5 Hz, and 101 Hz). Where two expected sampling rates are selected, the two expected sampling rates may correspond to a low and high expected sampling rate. That is, the two expected sampling rates may correspond to the lower and upper bounds of the sensor sampling rate range. To illustrate, sampling rate line 634 may correspond to a lower bound (e.g., 99 Hz) and sampling rate line 636 may correspond to an upper bound (e.g., 101 Hz). Sampling rate line 638 and sampling rate line 640 may correspond to a lower bound and upper bound, respectively, of a wider expected sampling rate range (e.g., 100 Hz+/−50%). Other example sampling rates are also possible.

Returning again to FIG. 5, at block 508, the method 500 includes determining, by the processor, a first minimal latency timestamp based on a comparison of one or more previously stored interrupt timestamps and the plurality of expected sampling rates. This function may be performed in a number of ways and may involve one or more sub-processes.

In example implementations, this function may involve the processor utilizing a first array and a second array that are stored in memory, where each has a number of cells equal to the number of expected sampling rates determined in step 502. In some examples, the first and second arrays may have been initially created after the plurality of expected sampling rates were determined and/or before the processor received the interrupt signal in block 502 (e.g., the first and second arrays may have been created when the processor received one or more previous interrupt signals).

The first array may represent a minimal latency value for each of the expected sampling rates, and the second array may represent a minimal latency identifier for each of the expected sampling rates. Each cell of the first array may be initialized with a value of infinity, and each cell of the second array may be initially empty.

A minimal latency identifier may correspond to a timestamp whose value results in the smallest latency value for a given expected sampling rate. Said another way, an ideal interrupt timestamp value that corresponds to a given timestamp may be subtracted from the given timestamp. The minimal latency identifier identifies the interrupt timestamp whose value results in the smallest number after such subtraction is performed. An interrupt timestamp whose value is less than an ideal interrupt timestamp value (e.g., such a timestamp may correspond to an interrupt signal that arrived at the AP ahead of an expected sampling rate) will result in a negative latency. A negative latency is smaller than a zero-value or positive-value latency and thus, a minimal latency value for a given expected sampling rate may have a negative value.

In some examples, a minimal latency identifier may indicate a number associated with an interrupt signal (e.g., an interrupt number) corresponding to a given interrupt timestamp that results in a minimal latency value. In other examples, the minimal latency identifier may indicate an ideal interrupt timestamp value associated with a given interrupt timestamp (e.g., 0.01 (seconds)*interrupt number) that results in a minimal latency value.

Figure 7A:
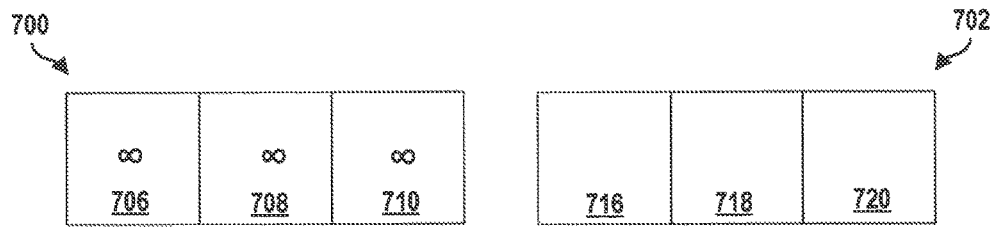
FIG. 7A is a conceptual diagram illustrating an example of initialized arrays stored in memory.

To illustrate, FIG. 7A is a conceptual diagram illustrating an example of initialized arrays stored in memory. Array 700 may represent an example minimal latency value array and array 702 may represent a minimal latency identifier array. As shown, the array 700 includes cells 706, 708, and 710, and similarly, the array 702 includes cells 716, 718, and 720. The cells 706 and 716 may correspond to a first expected sampling rate, the cells 708 and 718 may correspond to a second expected sampling rate, and the cells 710 and 720 may correspond to a third expected sampling rate. As shown, the cells 706, 708, and 710 are initialized with a value of infinity, and the cells 716, 718, and 720 are initially empty. These arrays may be updated as the processor receives interrupt signals.

Figure 6C:
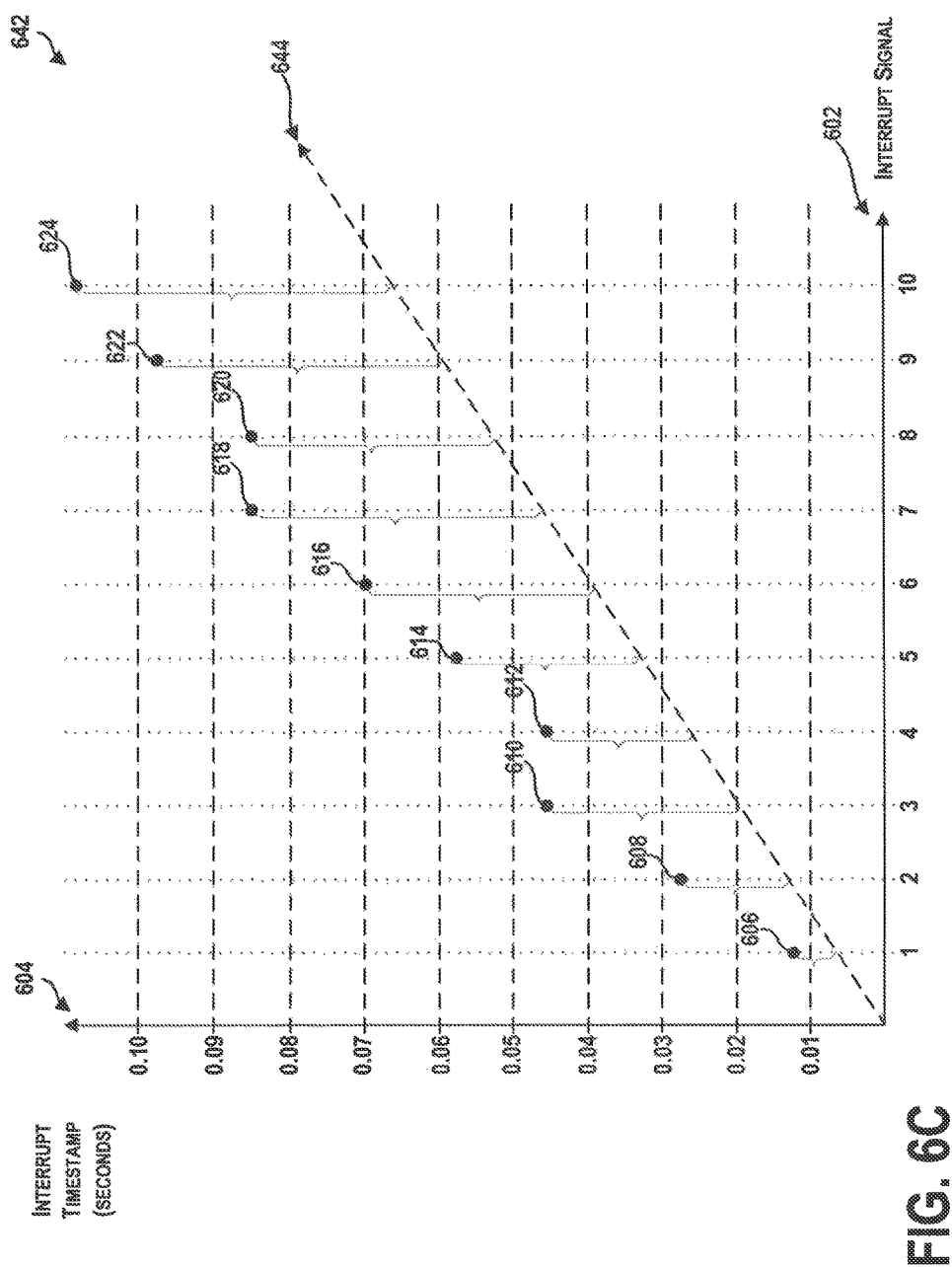
FIG. 6C is a conceptual diagram illustrating an example of determining latencies relative to an example expected sampling rate.

For example, after the processor receives a given interrupt signal and stores a corresponding interrupt timestamp, the processor may determine a respective latency of the interrupt timestamp relative to each of the plurality of expected sampling rates. To illustrate, FIG. 6C is a conceptual diagram illustrating an example of determining latencies relative to an example expected sampling rate. Diagram 642 is similar to FIG. 6A, but includes sampling rate line 644 that may indicate a first expected sampling rate (e.g., a high expected sampling rate). The diagram 642 also includes respective brackets that connect the points 606-624 to the sampling rate line 644. The latency for a given timestamp may be determined by determining the difference between a timestamp value and an ideal interrupt timestamp value derived from the expected sampling rate. Illustratively, the latency may be determined by determining the length of a given bracket. Notably, the latency for a given timestamp relative to an expected sampling rate may be negative. For example, a sampling rate line may be above the points 606-624, and the respective lengths of the brackets may then indicate a negative latency.

After the processor determines the latency of a timestamp relative to a given expected sampling rate, the processor may then compare the determined latency with the value stored in the cell of the first array (e.g., the minimal latency value array) that corresponds to the given expected sampling rate. If the determined latency is lower than the previously stored value in the cell of the first array, the cell may be updated with the value of the determined latency, and an interrupt number may be saved in the cell of the second array that correspond to the given expected sampling rate. An interrupt number may identify the i-th interrupt signal received by the processor that corresponds to the minimal latency timestamp, where i is an integer greater than zero. For example, the saved interrupt number may indicate that the minimal timestamp corresponds to the first, second, fifth, tenth, etc., interrupt signal that the processor received. Alternatively, instead of storing interrupt numbers in the second array, the processor may store an ideal interrupt timestamp value associated with the interrupt signal. In some examples, the sensor and/or sensor hub may transmit such a value to the AP.

Figure 7B:
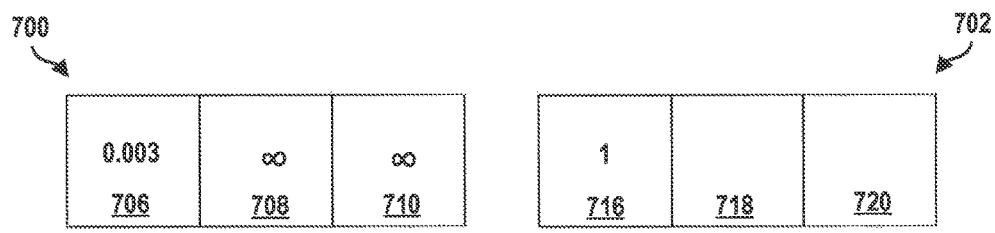
FIG. 7B is a conceptual diagram illustrating an example of updated arrays stored in memory.

To illustrate, FIG. 7B is a conceptual diagram illustrating an example of updated arrays stored in memory. FIG. 7B may illustrate the arrays 700 and 702 from FIG. 7A after being updated. As noted above, the cell 706 may correspond to a first expected sampling rate, such as the sampling rate represented by the sampling rate line of 644 of FIG. 6C. The cell 706 may have been updated as shown in FIG. 7B as a result of the processor comparing the latency of a first interrupt timestamp, such as the interrupt timestamp represented by the point 606 in FIG. 6C, with the value of the cell 706 in FIG. 7A and determining that the latency was less than the previously stored value of the cell 706 (e.g., 0.003 seconds is less than infinity). The cell 716 may have been updated as shown in FIG. 7B (e.g., to identify that the first interrupt signal corresponds to this minimal latency timestamp) in response to the processor updating the cell 706. The cells 708 and 718 and the cells 710 and 720 corresponding to the second and third expected sampling rates, respectively, may be updated in a similar manner.

In practice, after the processor determines whether to update the cells for each expected sampling rate, the processor may receive an additional interrupt signal, such as the interrupt signal that corresponds to the interrupt timestamp represented by the point 608 in FIG. 6C. Similar to the first interrupt timestamp, the processor may determine the latency associated with the additional interrupt signal relative to first expected sampling rate. The processor may then compare the determined latency with the value stored in the cell 706 of FIG. 7B. In this example, the processor does not update the cell 706 (or the cell 716) because the latency associated with the additional interrupt signal is greater than the previously stored value of the cell 706. This comparison may be conceptualized by comparing the relative lengths of the brackets shown in FIG. 6C. The point with the shortest bracket may be the minimal latency timestamp for the given expected sampling rate (in situations where there is a negative latency, the point with the longest, negative bracket may be the minimal latency timestamp). The processor may again repeat these update operations for the second and third expected sampling rates.

Returning to FIG. 5, at block 510, the method 500 includes determining, by the processor, a second minimal latency timestamp based on the interrupt timestamp, one or more previously stored interrupt timestamps, and the plurality of expected sampling rates, where the second minimal latency timestamp indicates an interrupt timestamp among the interrupt timestamp and the one or more previously stored interrupt timestamps whose value results in a smallest latency value. This function may be performed in a manner similar to that discussed above. For example, this function may involve the processor computing the latency of the interrupt timestamp relative to each of the plurality of expected sampling rates and determining whether to update the first and second arrays.

In example implementations, determining the second minimal latency timestamp may then be based on the second array (e.g., the minimal latency identifier array). For example, the processor may determine the second minimal latency timestamp based on the saved interrupt numbers from the second array that identify timestamps with minimal latencies.

Figure 7C:
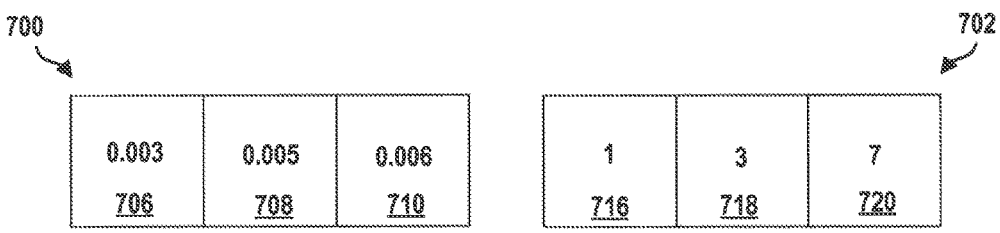
FIG. 7C is a conceptual diagram illustrating an example of updated arrays stored in memory.

To illustrate an example of the processor determining the first and second minimal latency timestamps, FIG. 7C is a conceptual diagram illustrating an example of updated arrays stored in memory. FIG. 7C depicts the arrays 700 and 702 sometime after the processor received the seventh interrupt signal and updated the arrays. In some examples, the processor may determine the first minimal latency timestamp by identifying the lowest interrupt number stored in the second array 702. Similarly, the processor may determine the second minimal latency timestamp by identifying the highest interrupt number. In such an example, referring to the array 702, the processor may set the first minimal latency timestamp to 1 and the second minimal latency timestamp to 7.

In other examples, the processor may determine the first minimal latency timestamp by identifying the highest interrupt number that is less than or equal to K, where K is an integer number of consecutive interrupt timestamps. In such an example and when K is equal to 3, referring to the array 702 in FIG. 7C, the processor may set the first minimal latency timestamp to 3. K may represent the fewest number of consecutive interrupt timestamps that contains at least one minimal latency timestamp, and K may be determined by one or more characteristics of the sensor, sensor hub, and/or AP. In practice, K consecutive interrupt timestamps may correspond to a portion of a second of data from the sensor. In examples where the second array includes ideal interrupt timestamp values, K may be a time value (e.g., a predetermined time after the processor is powered on).

In some examples, the processor may determine the second minimal latency timestamp by identifying the lowest interrupt number that is greater than i-K, where i is the number of the interrupt signal that generated the current interrupt timestamp. In such an example and where K is equal to 2 and i is equal to 8, the processor may set the second minimal latency timestamp to 7. In an example where K is equal to 5 and i is equal to 7, the processor may set the second minimal latency timestamp to 3. Other examples of determining the first and second minimal latency timestamps are also possible.

It should be understood that the above discussion regarding the first and second arrays describes operations that may have occurred before the processor received the interrupt signal at block 502. As such, after the processor receives the interrupt signal and stores the corresponding timestamp, the processor may determine the first and second minimal latency timestamps based on the first and second arrays that may have been updated based on one or more previously stored interrupt timestamps. In this way, the processor may determine whether the timestamp of the received interrupt signal modifies the first or second minimal latency timestamps.

Returning back to FIG. 5, at block 512, the method 500 includes determining, by the processor, an estimated sampling rate of the sensor based on the first minimal latency timestamp and the second minimal latency timestamp. In some examples, this function may involve determining the number of interrupt signals between the second minimal latency timestamp and the first minimal latency timestamp, determining the amount of time (e.g., in seconds) between the second minimal latency timestamp and the first minimal latency timestamp, and dividing the determined number of interrupt signals by the determined amount of time. In some examples, the processor may also determine any offset between the sensor and/or senor hub clock and the AP clock based on the minimal latency timestamps.

Figure 6D:
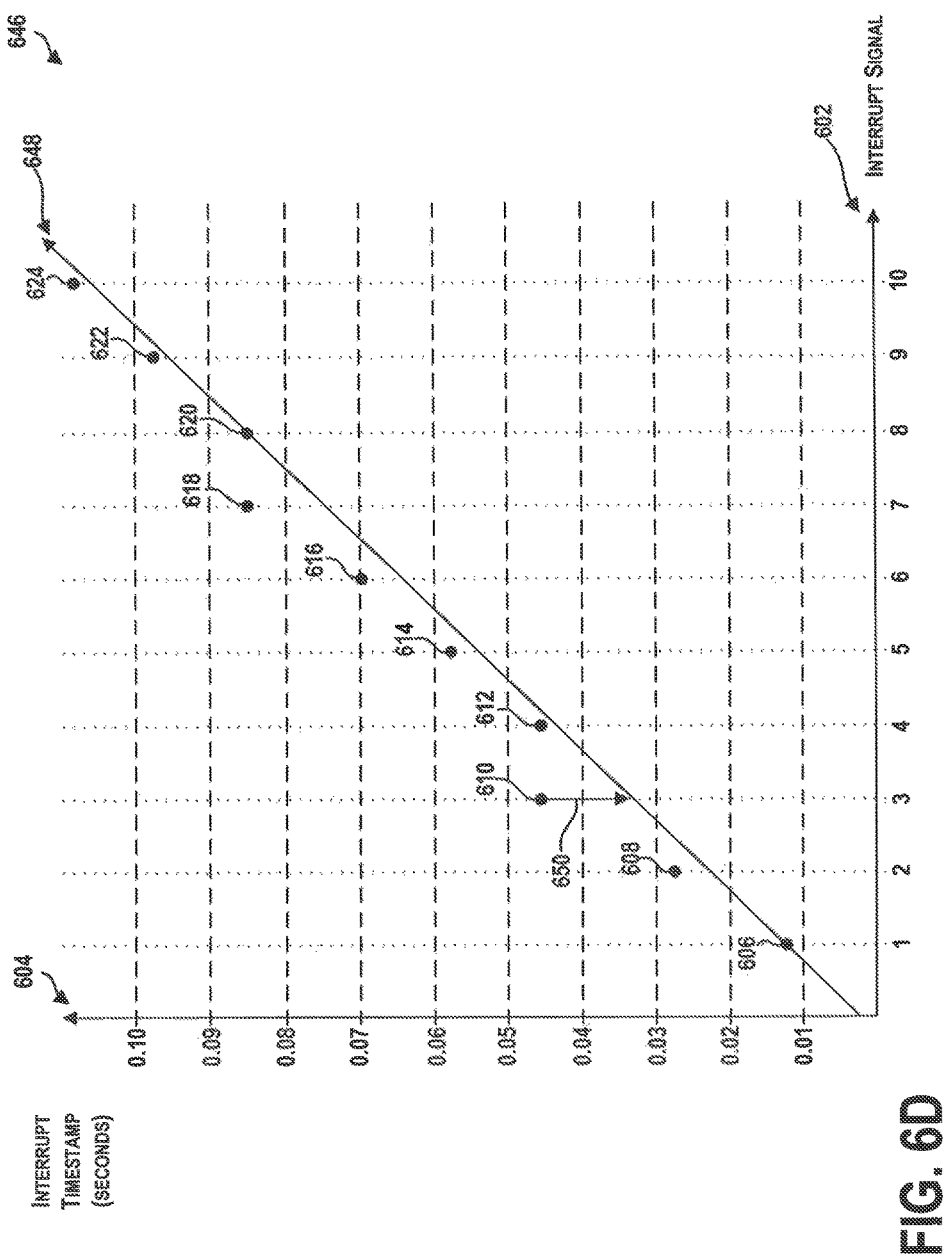
FIG. 6D is a conceptual diagram illustrating an example of an estimated sampling rate.

To illustrate, FIG. 6D is a conceptual diagram illustrating an example of an estimated sampling rate. Diagram 646 is similar to FIG. 6A, but includes sampling rate line 648 that may represent an estimated sampling rate. As shown, the estimated sampling rate line 648 passes through the point 606 and the point 620, which may have been determined to be the first and second minimal latency timestamps, respectively.

In practice, determining the estimated sampling rate may involve utilizing the first and/or the second arrays. For example, the processor may determine the number of interrupt signals between the second minimal latency timestamp and the first minimal latency timestamp by using the interrupt numbers stored in the second array (e.g., the minimal latency timestamp array). The processor may then use the respective interrupt timestamps associated with those interrupt numbers to determine the amount of time between the second minimal latency timestamp and the first minimal latency timestamp.

There may be some error that occurs in determining the estimated sampling rate. That is, the estimated sampling rate may deviate slightly from the actual rate at which the processor receives the interrupt signals. As a general matter, as the N number of expected sampling rates increases, the error associated with the estimated sampling rate decreases.

At block 514, the method 500 includes determining, by the processor, an adjusted interrupt timestamp corresponding to the interrupt signal based on the estimated sampling rate and the interrupt timestamp. That is, based on the estimated sampling rate and the stored interrupt timestamp, the processor may determine an adjusted interrupt timestamp that more accurately reflects the time at which the sensor generated the sensor event. This function may be performed in a number of manners.

In some examples, this function may involve the processor mapping a given interrupt timestamp to the estimated sampling rate. For example, the processor may interpolate an adjusted interrupt timestamp using the first and second minimal latency timestamps that defined the estimated sampling rate. To illustrate, returning back to FIG. 6D, an adjusted interrupt timestamp for the interrupt timestamp represented by the point 610 may be determined by mapping the point 610 to the estimated sampling rate line 648 (as indicated by arrow 650). The adjusted interrupt timestamp may be assigned a time value that corresponds to the point (e.g., identified by the arrow 650) where the dotted line originating from interrupt signal 3 intersects with the sampling rate 648. In this example, the adjusted interrupt timestamp has a time value of between 0.03 and 0.035 seconds. Notably, interrupt timestamps generated as a result of interrupt signals received after the estimated sampling rate is determined (e.g., interrupt timestamps represented by the point 622 and 624) may have improved accuracy based on the estimated sampling rate.

As noted above, in practice, the estimated sampling rate may have some error. Accordingly, in some examples, determining the adjusted interrupt timestamp may involve utilizing one or more error correction functions. In some examples, an error correction function may involve the processor determining $\text{timestamp}_{prop}(t)$, which may define a propagated timestamp value for a stored interrupt timestamp, t. $\text{timestamp}_{prop}(t)$ may be determined using the following equation:

$$\text{timestamp}_{prop}(t) = \text{timestamp}_{adj}(t-1) + \frac{1}{\text{rate}_{est}}$$

In this equation, $\text{timestamp}_{adj}(t-1)$ is the value of the adjusted interrupt timestamp that is immediately before the interrupt timestamp that is being adjusted, and $\text{rate}_{est}$ is the estimated sampling rate from block 510.

The adjusted interrupt timestamp, $\text{timestamp}_{adj}(t)$, may then be determined using the following equation:

$$\text{timestamp}_{adj}(t) = f(\text{timestamp}_{prop}(t), \text{timestamp}_{stored}(t))$$

In this equation, $\text{timestamp}_{stored}(t)$ is the value of the stored interrupt timestamp that is currently being adjusted, and $f(\cdot)$ is a function that may be non-linear and/or non-symmetric. In this way, the function may correct for errors that may have arisen in determining the expected sampling rate. In some examples, this function may take the form of the following equations:

if $\text{timestamp}_{prop}(t) > \text{timestamp}_{stored}(t)$:

$$\text{timestamp}_{prop}(t) - (\text{timestamp}_{prop}(t) - \text{timestamp}_{stored}(t)) * 0.1$$

if $\text{timestamp}_{prop}(t) < \text{timestamp}_{stored}(t)$:

$$\text{timestamp}_{prop}(t) - (\text{timestamp}_{prop}(t) - \text{timestamp}_{stored}(t)) * 0.01$$

It should be understood that other error correction functions may be utilized and that the adjusted interrupt timestamp may be determined in other manners as well.

After determining the adjusted interrupt timestamp, the processor may perform additional functions. One such function may involve replacing the stored interrupt timestamp with the adjusted timestamp. The processor may then store measurement data from the sensor along with the adjusted interrupt timestamp, both of which may be used in a variety of applications.

In practice, the processor may adjust a given interrupt timestamp in real time or approximately real time. As the processor generates and stores the given interrupt timestamp, the processor may perform the above functions to adjust the given interrupt timestamp. Furthermore, as described above, the method 500 may be advantageous in that it may allow the processor to adjust interrupt timestamps without having the processor store a history of each interrupt timestamp that would otherwise grow linearly in time. In this way, memory and/or processing power may be conserved.

Further in practice, the method 500 may be performed for a plurality of interrupt signals. At some point in time, the estimated sampling rate may change, for example, as a result of a new interrupt timestamp becoming the second minimal latency timestamp. Accordingly, a first set of adjusted interrupt timestamps may have a different estimated sampling rate than a second set of adjusted interrupt timestamps and so forth. Further, there may exist discontinuities between the first and second sets. In particular, such discontinuities may exist between the last adjusted interrupt timestamp of the first set and the first adjust interrupt timestamp of the second set.

Figure 8A:
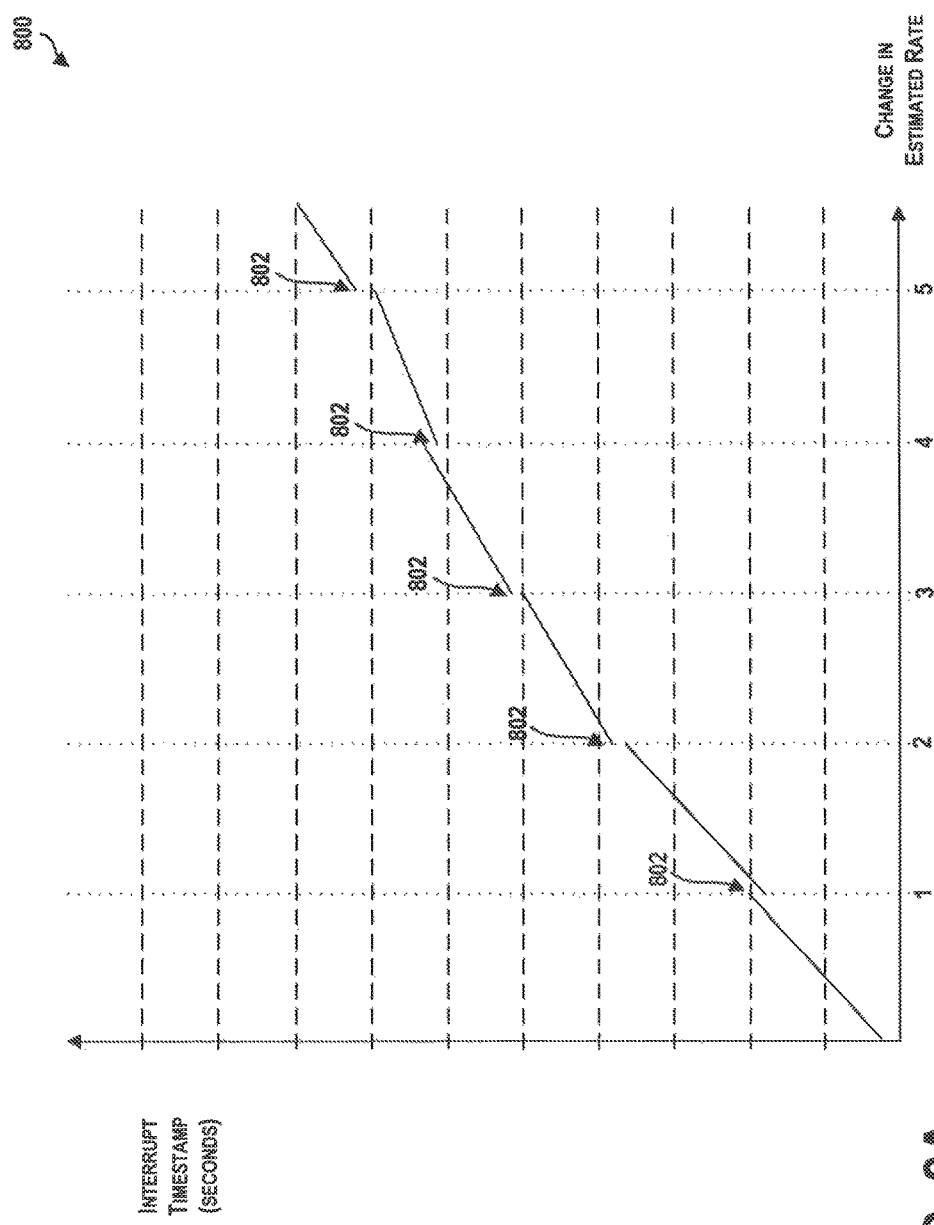
FIG. 8A is a conceptual diagram illustrating an example of adjusted interrupt timestamps based on varying estimated sampling rates.

To illustrate, FIG. 8A is a conceptual diagram illustrating an example of adjusted interrupt timestamps based on varying estimated sampling rates. Diagram 800 shows various lines representing adjusted interrupt timestamps that were determined based on different estimated sampling rates. The diagram 800 may represent adjusted interrupt timestamps that are determined without using an error correction function. As shown, various discontinuities 802 exist where one estimated sampling rate ends and another begins. In certain applications, such discontinuities may be undesirable.

Figure 8B:
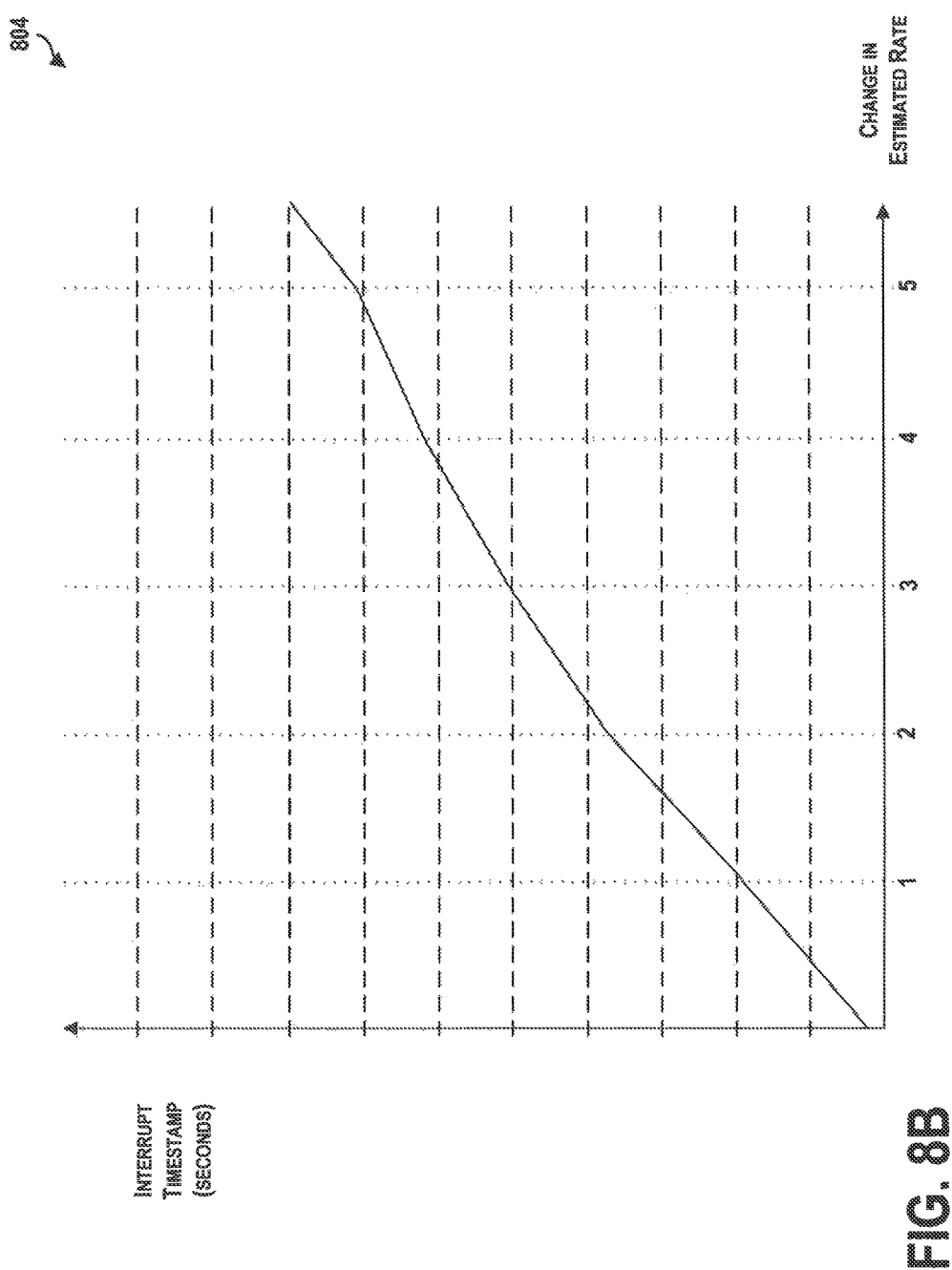
FIG. 8B is a conceptual diagram illustrating an example of adjusted interrupt timestamps based on varying estimated sampling rates after error correction.

Accordingly, in at least some examples, the processor may be configured to correct the discontinuities. In some examples, such modification may involve the processor performing an error correction function, as described above, to the adjusted interrupt timestamps. To illustrate, FIG. 8B is a conceptual diagram illustrating an example of adjusted interrupt timestamps based on varying estimated sampling rates after error correction. As shown in diagram 804, the discontinuities 802 from FIG. 8A have been removed.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
generating a sensor event based on detection of a physical event by a sensor;
based on generating the sensor event, receiving, by a processor from the sensor, an interrupt signal;
generating and storing, by the processor, an interrupt timestamp corresponding to the interrupt signal, wherein a latency exists between a point in time that the processor receives the interrupt signal and a point in time that the processor generates and stores the interrupt timestamp;
determining, by the processor, a plurality of expected sampling rates associated with the sensor, wherein a given sampling rate is based on a sampling time period;
comparing, by the processor, one or more previously stored interrupt timestamps with the plurality of expected sampling rates to determine a first minimal latency timestamp;
determining, by the processor, a second minimal latency timestamp based on the interrupt timestamp, one or more previously stored interrupt timestamps, and the plurality of expected sampling rates, wherein the second minimal latency timestamp indicates an interrupt timestamp among the interrupt timestamp and the one or more previously stored interrupt timestamps whose value results in a smallest latency value;
determining, by the processor, an estimated sampling rate of the sensor based on the first minimal latency timestamp and the second minimal latency timestamp;
adjusting, by the processor, the interrupt timestamp corresponding to the interrupt signal based on the estimated sampling rate and the interrupt timestamp to remove at least a portion of the latency in the interrupt timestamp;

after adjusting the interrupt timestamp, replacing, by the processor, the interrupt timestamp that is stored with an adjusted interrupt timestamp having the at least the portion of the latency removed; and updating, by the processor, the interrupt signal with the adjusted interrupt timestamp to more accurately reflect when the sensor generated the interrupt signal.

2. The method of claim 1, wherein determining the plurality of expected sampling rates comprises determining the plurality of expected sampling rates based on one or more characteristics of the sensor.

3. The method of claim 1, wherein determining the plurality of expected sampling rates comprises determining an expected sampling rate range, and wherein the expected sampling rate range comprises the plurality of expected sampling rates.

4. The method of claim 1, wherein determining the second minimal latency timestamp comprises determining the second minimal latency timestamp based on at least one of an array of minimal latency identifiers or an array of minimal latency values.

5. The method of claim 4, wherein determining the estimated sampling rate comprises determining the estimated sampling rate based on the array of minimal latency identifiers and the array of minimal latency values.

6. The method of claim 1, wherein the plurality of expected sampling rates comprises a low expected sampling rate and a high expected sampling rate.

7. The method of claim 1, wherein the estimated sampling rate is a first estimated sampling rate, the method further comprising:
receiving, by the processor, an additional interrupt signal;
storing, by the processor, an additional interrupt timestamp corresponding to the additional interrupt signal; and
updating, by the processor, the second minimal latency timestamp based on the additional interrupt timestamp.

8. The method of claim 7, further comprising:
determining, by the processor, a second estimated sampling rate based on the first minimal latency timestamp and the updated second minimal latency timestamp; and
determining, by the processor, an additional adjusted interrupt timestamp corresponding to the additional interrupt signal based on the second estimated sampling rate and the additional interrupt timestamp.

9. The method of claim 1, wherein adjusting the interrupt timestamp comprises adjusting the interrupt timestamp based on a previous adjusted interrupt timestamp and the estimated sampling rate.

10. The method of claim 9, wherein adjusting the interrupt timestamp further comprises adjusting the interrupt timestamp based on an error correction function, wherein the error correction function accounts for error associated with the estimated sampling rate.

11. A non-transitory computer readable memory having stored therein instructions, that when executed by a computing device, cause the computing device to perform functions comprising:
generating a sensor event based on detection of a physical event by a sensor;
based on generating the sensor event, receiving, by a processor from the sensor, an interrupt signal;
generating and storing an interrupt timestamp corresponding to the interrupt signal, wherein a latency exists between a point in time that the interrupt signal is received and a point in time that the interrupt timestamp is generated and stored;
determining a plurality of expected sampling rates associated with the sensor, wherein a given sampling rate is based on a sampling time period;
comparing one or more previously stored interrupt timestamps with the plurality of expected sampling rates to determine a first minimal latency timestamp;
determining a second minimal latency timestamp based on the interrupt timestamp, one or more previously stored interrupt timestamps, and the plurality of expected sampling rates, wherein the second minimal latency timestamp indicates an interrupt timestamp among the interrupt timestamp and the one or more previously stored interrupt timestamps whose value results in a smallest latency value;
determining an estimated sampling rate of the sensor based on the first minimal latency timestamp and the second minimal latency timestamp;
adjusting the interrupt timestamp corresponding to the interrupt signal based on the estimated sampling rate and the interrupt timestamp to remove at least a portion of the latency in the interrupt timestamp;
after adjusting the interrupt timestamp, replacing the interrupt timestamp that is stored with an adjusted interrupt timestamp having the at least the portion of the latency removed; and
updating the interrupt signal with the adjusted interrupt timestamp to more accurately reflect when the sensor generated the interrupt signal.

12. The non-transitory computer readable memory of claim 11, wherein determining the second minimal latency timestamp comprises determining the second minimal latency timestamp based on at least one of an array of minimal latency identifiers or an array of minimal latency values.

13. The non-transitory computer readable memory of claim 11, wherein adjusting the interrupt timestamp comprises adjusting the interrupt timestamp based on a previous adjusted interrupt timestamp and the estimated sampling rate.

14. A computing device comprising:
one or more processors;
a sensor; and
data storage configured to store instructions that, when executed by the one or more processors, cause the computing device to perform functions including:
generating a sensor event based on detection of a physical event by the sensor;
based on generating the sensor event, receiving, by the one or more processors from the sensor, an interrupt signal;
generating and storing, by the one or more processors, an interrupt timestamp corresponding to the interrupt signal, wherein a latency exists between a point in time that the one or more processors receives the interrupt signal and a point in time that the one or more processors generates and stores the interrupt timestamp;
determining, by the one or more processors, a plurality of expected sampling rates associated with the sensor, wherein a given sampling rate is based on a sampling time period;
comparing, by the one or more processors, one or more previously stored interrupt timestamps with the plurality of expected sampling rates to determine a first minimal latency timestamp;

determining, by the one or more processors, a second minimal latency timestamp based on the interrupt timestamp, one or more previously stored interrupt timestamps, and the plurality of expected sampling rates, wherein the second minimal latency timestamp indicates an interrupt timestamp among the interrupt timestamp and the one or more previously stored interrupt timestamps whose value results in a smallest latency value;

determining, by the one or more processors, an estimated sampling rate of the sensor based on the first minimal latency timestamp and the second minimal latency timestamp;

adjusting, by the one or more processors, the interrupt timestamp corresponding to the interrupt signal based on the estimated sampling rate and the interrupt timestamp to remove at least a portion of the latency in the interrupt timestamp;

after adjusting the interrupt timestamp, replacing, by the one or more processors, the interrupt timestamp that is stored with an adjusted interrupt timestamp having the at least the portion of the latency removed; and updating, by the one or more processors, the interrupt signal with the adjusted interrupt timestamp to more accurately reflect when the sensor generated the interrupt signal.

15. The computing device of claim 14, wherein determining the second minimal latency timestamp comprises determining the second minimal latency timestamp based on at least one of an array of minimal latency identifiers or an array of minimal latency values.

16. The computing device of claim 14, wherein adjusting the interrupt timestamp comprises adjusting the interrupt timestamp based on a previous adjusted interrupt timestamp and the estimated sampling rate.

17. The computing device of claim 16, wherein adjusting the interrupt timestamp further comprises adjusting the interrupt timestamp based on an error correction function, wherein the error correction function accounts for error associated with the estimated sampling rate.

* * * * *